United States Patent [19]
Ridgley

[11] Patent Number: 5,975,161
[45] Date of Patent: Nov. 2, 1999

[54] NURSE TANK MASS SENSOR

[76] Inventor: William S. Ridgley, 2102 Pine, Harlan, Iowa 51537

[21] Appl. No.: 09/002,223

[22] Filed: Dec. 31, 1997

[51] Int. Cl.[6] ....................................................... B65B 1/04
[52] U.S. Cl. .............................. 141/231; 141/83; 280/830
[58] Field of Search .............................. 141/231, 99, 104, 141/83; 280/830, 838

[56] References Cited

U.S. PATENT DOCUMENTS

| | | | |
|---|---|---|---|
| 4,131,214 | 12/1978 | Rogers | 222/1 |
| 4,515,615 | 5/1985 | Eastin | 71/54 |
| 4,911,330 | 3/1990 | Vlaanderen et al. | 222/132 |
| 5,180,190 | 1/1993 | Kersey et al. | 280/838 |
| 5,263,824 | 11/1993 | Waldbeser et al. | 417/10 |

*Primary Examiner*—Steven O. Douglas
*Attorney, Agent, or Firm*—G. Brian Pingel

[57] ABSTRACT

A vehicle for transporting and delivering anhydrous ammonia. The vehicle includes a chassis and a large anhydrous ammonia tank. A mass flow sensor is provided on the chassis to accurately record transfer of anhydrous ammonia out of the tank. Accurate recording of anhydrous ammonia passing out of the tank allows the vehicle to dispense anhydrous ammonia to different customers from a single tank, and to deliver anhydrous ammonia in the field.

14 Claims, 12 Drawing Sheets

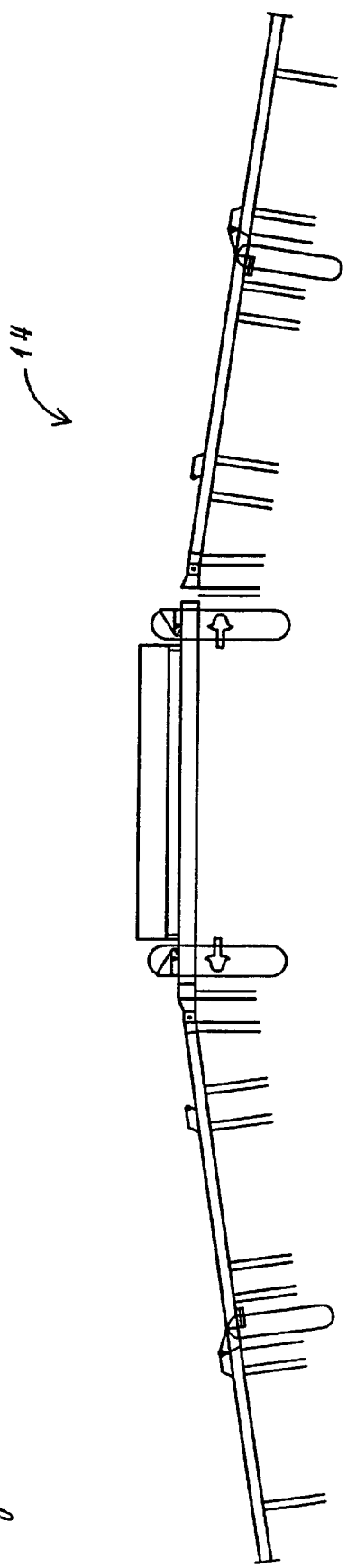
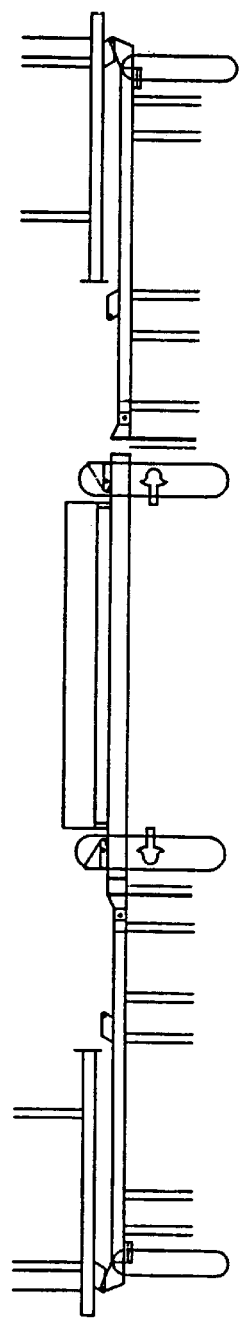
Fig. 5
Fig. 6

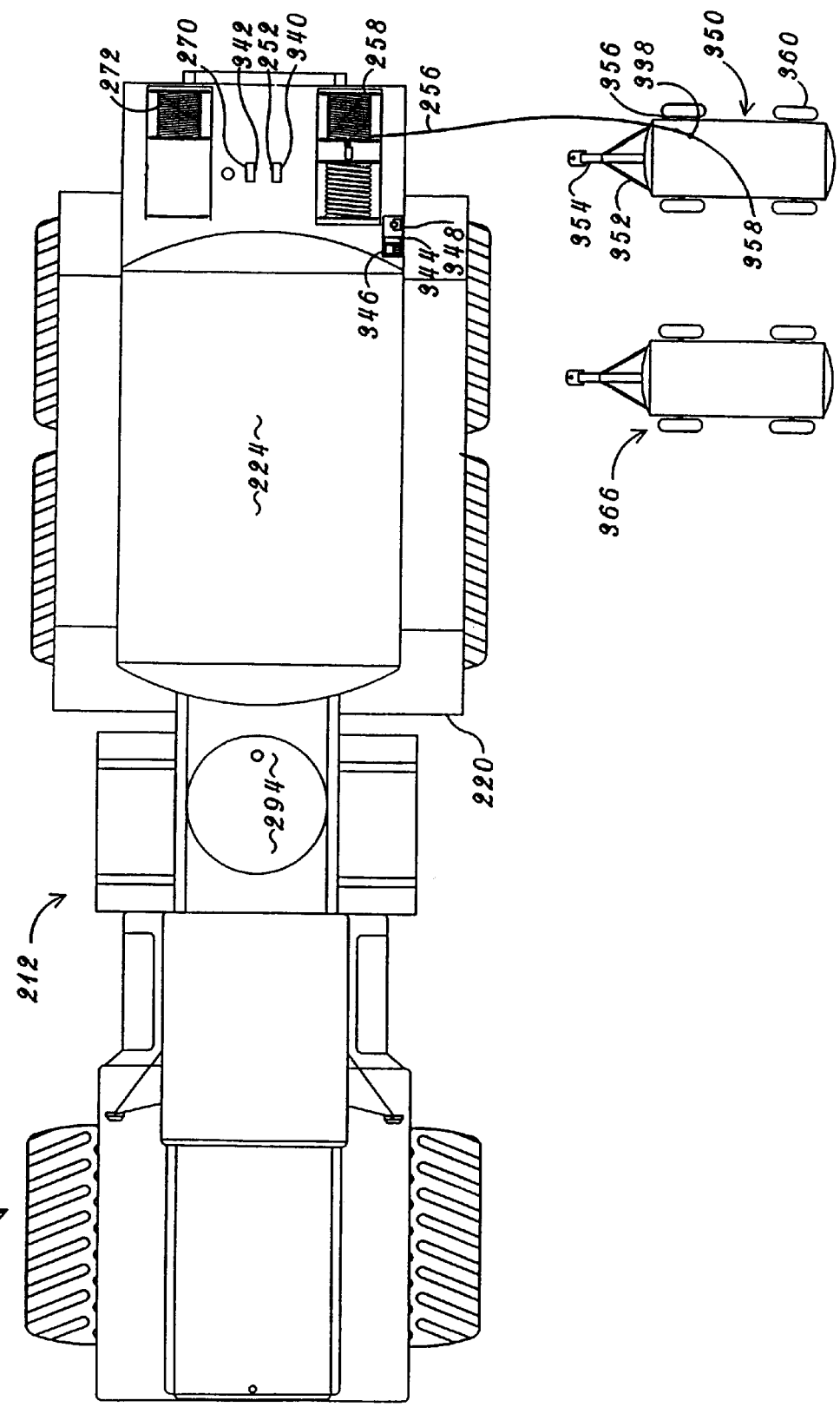

NURSE TANK MASS SENSOR

BACKGROUND OF THE INVENTION

1. Field of the Invention

The present invention relates to a vehicle for transporting and delivering anhydrous ammonia and, more particularly, to a transportation and delivery vehicle capable of accurately measuring anhydrous ammonia as it is being pumped.

2. Description of the Prior Art

It is well-known in the art to apply anhydrous ammonia to the soil to increase the nitrogen content thereof. For grasses such as corn, nitrogen application is required in many instances to achieve the full potential yield of the crop.

Anhydrous ammonia application systems typically include a high torque vehicle, such as a tractor, which pulls a tool bar or similar implement for cutting into the soil. Pulled behind the tool bar is a small trailer onto which is secured a small gas-tight tank. Hosing is routed forward from the tank to the tool bar and then to knives located on the tool bar. The knives are used to inject the anhydrous ammonia below the surface of the soil.

If the ambient temperature is sufficiently high, some of the anhydrous ammonia within the tank vaporizes and generates pressure within the tank. This pressure is used to force the vaporized anhydrous ammonia through the hoses to the knives. After the anhydrous ammonia has been injected into soil, the anhydrous ammonia is covered with additional soil to reduce the amount of anhydrous ammonia lost to the atmosphere.

Heretofore the amount of anhydrous ammonia delivered to the field has been monitored by weight. It is not possible to precisely gauge the weight of anhydrous ammonia needed in a particular field. Accordingly, numerous small tanks must be individually weighed and brought to the field. While this prior art technique has been used for many years to inject anhydrous ammonia into the soil, this technique has several drawbacks. One drawback is that due to the small capacity of these tanks, the pulling vehicle must stop frequently to have the empty tank replaced with a full tank.

Additionally, the prior art typically uses a pick-up truck, or similar vehicle, to pull the full tanks of anhydrous ammonia from a large stationary tank at a remote location to the applicator vehicle. This scenario often causes a potentially dangerous situation if a plurality of filled tanks are pulled behind a truck, or if the tank were to become detached from the truck during transit. The small capacity of the tanks also requires the pick-up to make numerous trips back and forth, thereby increasing the time on the road and the potential hazards naturally associated with pulling farm-style trailers on public highways.

An additional drawback associated with prior art systems is the inaccuracy in measuring the delivery of anhydrous ammonia. Because of this inaccuracy, anhydrous ammonia is typically delivered one whole tank at a time which has been previously weighed to estimate its contents. Heretofore, there has been no efficient way to accurately deliver less than a full tankload of anhydrous ammonia in the field.

The difficulties encountered hereinabove are sought to be eliminated by the present invention.

SUMMARY OF THE INVENTION

The present invention comprises a vehicle for transporting and delivering anhydrous ammonia. The vehicle includes a chassis, which itself includes a frame, a front wheel and a rear wheel operably coupled to the frame. Means are provided for driving at least one of the wheels. Additionally, an anhydrous ammonia tank is provided. Means are coupled to the tank for measuring a quantity of anhydrous ammonia passing out of the tank.

Preferably, the vehicle is provided with a pump to allow rapid delivery of anhydrous ammonia and a tank for delivery of nitrogen stabilizer. The vehicle is constructed for highway speeds of about one hundred kilometers per hour.

BRIEF DESCRIPTION OF THE DRAWINGS

FIG. 5 is a rear elevation of the tool bar of FIG. 4;

FIG. 6 is a rear elevation of the tool bar of FIG. 4 shown in the folded position;

FIG. 13 is a top elevation of the nurse tank of FIG. 8 supplying smaller tank assemblies with anhydrous ammonia.

DETAILED DESCRIPTION OF THE PREFERRED EMBODIMENT

Figure 1:
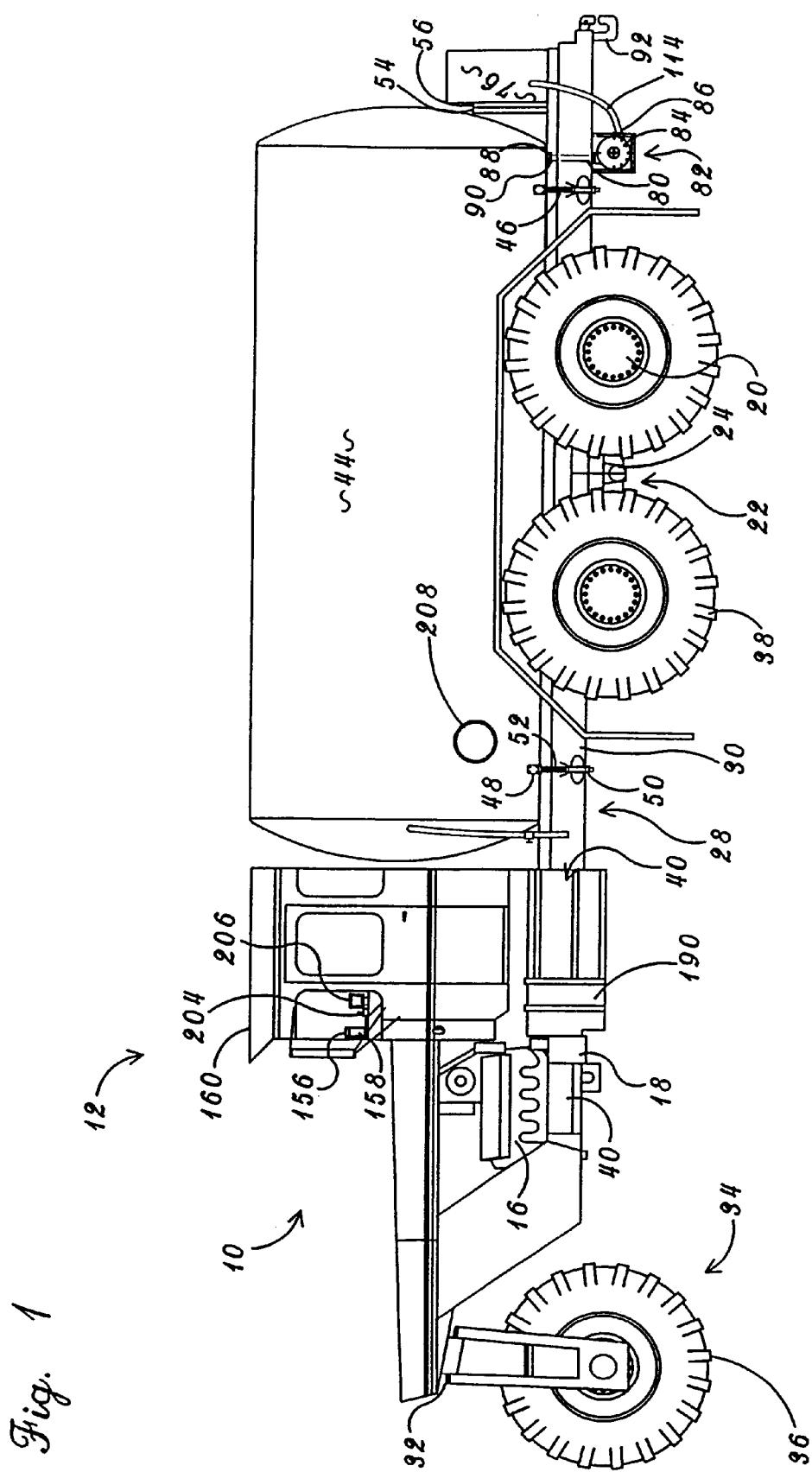
FIG. 1 is a side view of the pulling vehicle which is supplied with anhydrous ammonia by the nurse tank of the present invention.
Figure 4:
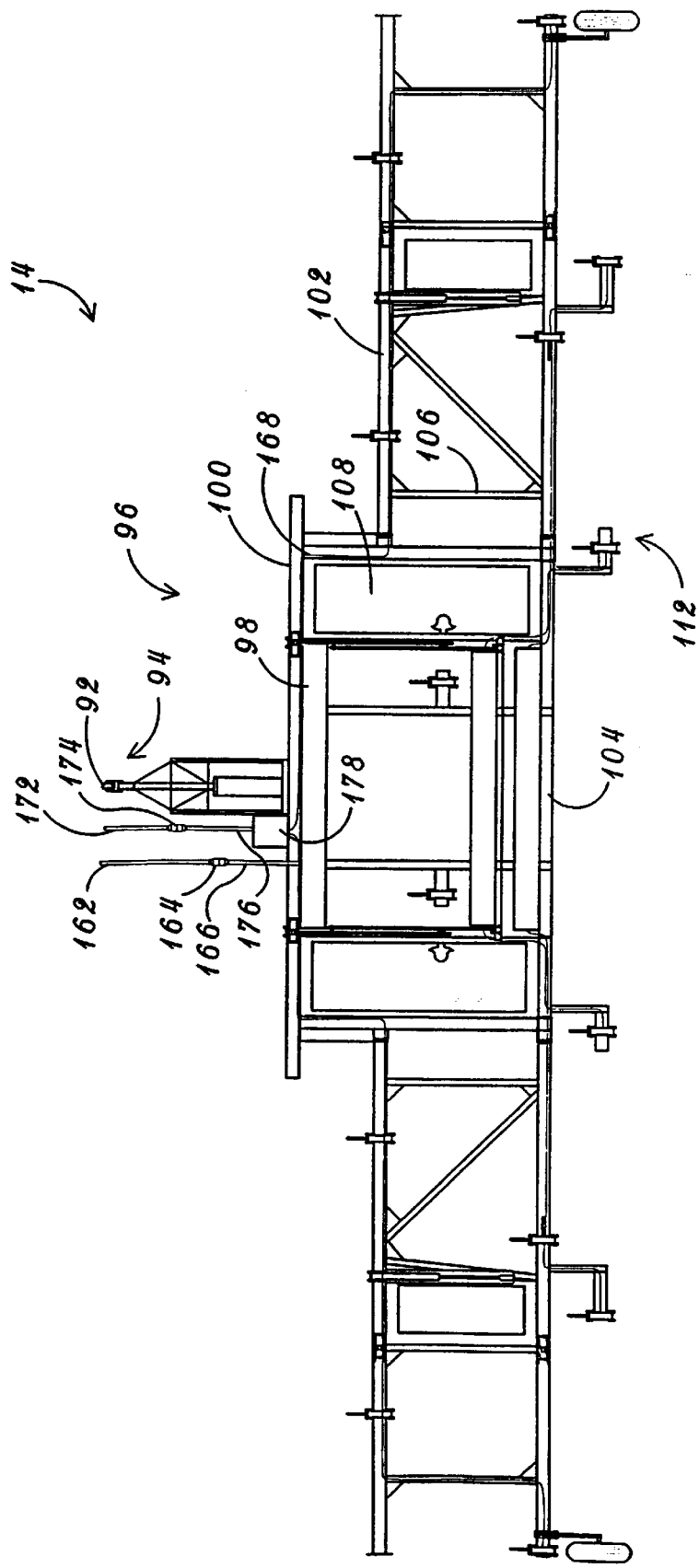
FIG. 4 is a top elevation of the tool bar of the present invention.

With reference to the drawings, shown in FIGS. 1 and 4, is an anhydrous ammonia applicator 10 having a pulling vehicle 12 and a tool bar 14. In the preferred embodiment, the pulling vehicle 12 is a field floater chassis such as that distributed by Ag-Chem under the name Terra-Gator®, 2505, which has a payload capacity of over ten thousand kilograms and preferably a payload capacity of eighteen thousand nine hundred and fifteen kilograms. While the pulling vehicle 12 may be any vehicle capable of carrying an anhydrous ammonia tank and pulling a tool bar, the large payload capacity, large towing capacity, and maneuverability of the field floater chassis make it particularly well-suited for the present application. The engine 16 is a Caterpillar® 3176B Turbocharged/Air to Air Aftercooled in-line six cylinder diesel with four hundred SAE horsepower at 2100 RPM and a peak torque of 1,282 foot pounds at 1500 RPM.

The transmission 18 is an Eaton Fuller® RTLO-14718-A, close ratio, manual having eighteen speeds forward, four in reverse and a torque capacity of 1,650 foot pounds. The tandem rear axles 20 are preferably Rockwell-International outboard planetary final reduction type. The tandem axle configuration has full time 4-wheel drive, and cab-controlled lockable interaxle differential (not shown) which may be shifted from the locked position for maximum traction to the unlocked position for minimum tire wear. The rear suspension system 22 is a tandem walking beam type with rigid saddles 24 which allows the axles to oscillate independently over rough ground.

The pulling vehicle 12 is provided with dual air brake system (not shown) which activates wedge-type drums. The pulling vehicle 12 is provided with a frame 28 having main frame rails 30 constructed of stress-relieved rectangular wall steel tubing. The pulling vehicle 12 is provided with a hydrostatic steering system 32 directing a single front wheel 34. Provided around the front wheel 34 is a front tire 36 similar in construction to four rear tires 38. All five tires 36 and 38 are 66×43.00–25 flotation tires, with a 10-ply rating. All tires are provided with a locking ring (not shown) and an O-ring (not shown) on the inside of the wheel 34.

The pulling vehicle 12 is provided with a twelve-volt electrical system 40 with three 650 cold cranking amp batteries (not shown) and a one hundred and twenty amp alternator (not shown). The pulling vehicle 12 is also provided with an air system 42 having a 428.9 liter per minute compressor (not shown) governed at 8.28 bar. The air system 42 is also provided with dual 19,680 cubic centimeter reservoirs (not shown) and an air dryer (not shown). Secured onto the frame 28 of the pulling vehicle 12 is an anhydrous ammonia tank 44. The anhydrous ammonia tank 44 is constructed of steel with a capacity of 13,960 liters of anhydrous ammonia. The anhydrous ammonia tank 44 may be of any desired capacity from 5,700 liters to 32,000 liters. The anhydrous ammonia tank 44 is coupled to the frame 28 with a plurality of bolts 46. The bolts 46 are coupled to the tank 44 by a plurality of hinges 48. The ends of the bolts 46 are threaded and provided with nuts 50. The two forwardmost bolts 46 are provided with springs 52 to prevent torsion of the frame 28 from being transmitted to the tank 44. For each bolt 46, the frame 28 is fitted with a V-shaped retainer 54 which guides the bolts 46 and secures them to the frame 28.

Figure 3:
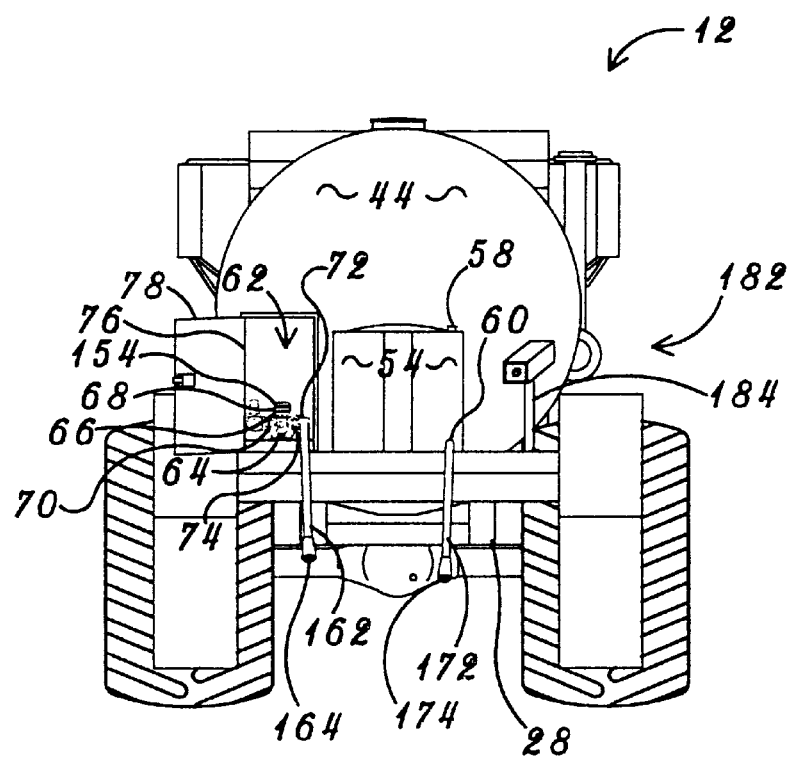
FIG. 3 is a rear view of the pulling vehicle of FIG. 1.

As shown in FIGS. 1 and 3, secured to the rear of the frame 28 is a corrosion resistant liquid container 54. In the preferred embodiment, the container 54 is constructed of crosslink polyolefin, but may be constructed of stainless steel or any material which is substantially chemically inert. The container 54 has a four hundred and sixteen liter capacity, but may have a capacity in the range of fifty liters to one thousand liters, or may have any desired capacity. The container 54 is approximately one meter high, one meter long and one meter deep. The container 54 is preferably attached to the frame 28 by straps 56 or similar releasable securement system to allow the container 54 to be removed from the pulling vehicle 12 when only anhydrous ammonia is being applied. The container 54 is also provided with a fluid inlet 58 and a fluid outlet 60. In the preferred embodiment, the container 54 is filled with a nitrogen stabilizing material such as a nitrapyrin/pyridine/xylene mixture. While the container 54 is filled with N-SERVE nitrogen stabilizer manufactured by Dow Elanco® of Indianapolis, Ind. in the preferred embodiment, the container may, of course, be filled with any agricultural product including, but not limited to, fertilizers such as potash and phosphate, pesticides and/or herbicides.

Secured to the frame 28, next to the container 54, is a fluid meter 62. In the preferred embodiment, the meter 62 is a Micro Motion Model D mass flow sensor manufactured by Micro Motion, Inc. of Boulder, Colo., or similar type meter such as those known in the art. The mass flow sensor meter 62 of the preferred embodiment is covered by U.S. Pat. Nos. 4,491,025, 4,726,508, 4,738,144, 4,768,385, 4,777,833, 4,823,613, 4,895,031, 4,955,239, 5,027,662, 5,231,884, and 5,301,557 which are incorporated herein by reference. The meter 62 may form part of a metering assembly 64, which includes a digital display counter 66 and a printer 68. A fluid intake 70 is provided below and forward of the metering assembly 64 and a fluid outlet 74 is provided to the rear of the meter 62. The meter 62 is preferably provided within a housing 76 secured to the frame 28. The housing 76 is constructed of steel and is provided with a door 78 to allow access to the meter 62, while preventing the meter 62 from being damaged by the elements or by materials being applied by the applicator 10.

As shown in FIG. 1, a pump 82 is secured to the frame 28 to pump anhydrous ammonia from the tank 44. In the preferred embodiment, the pump is a Corken® Z2000 Coro-vane® vane pump. The pump 82 is provided with an inlet 80, a blade housing 84 and an outlet 86. Coupled between an outlet 88 of the tank 44 and the inlet 80 of the pump 82 is an excess flow valve 90. The excess flow valve 90 may be of any type known in the art and is provided to shut off the flow of anhydrous ammonia from the tank if the rate of flow exceeds a predetermined rate.

Figure 2:
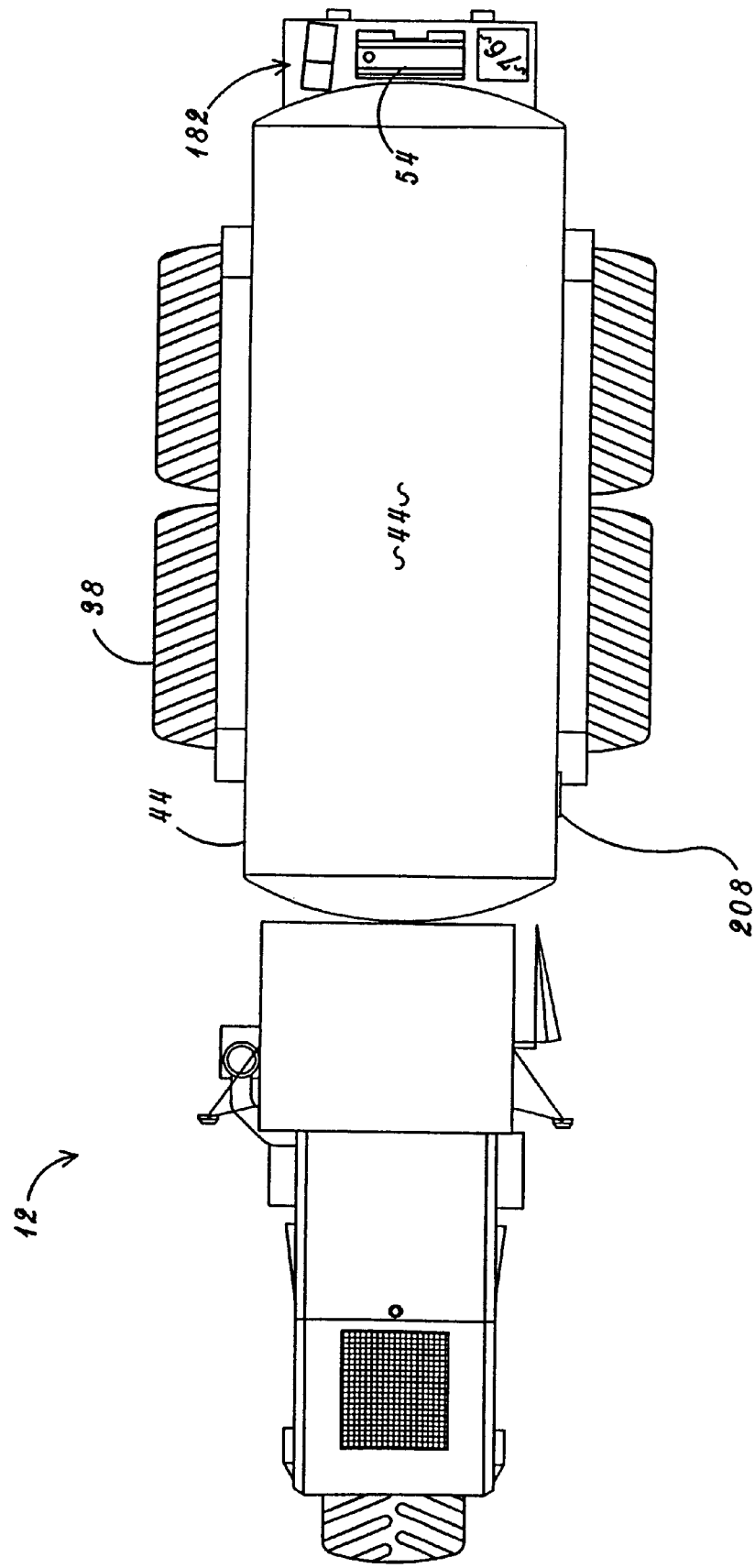
FIG. 2 is a top view of the pulling vehicle of FIG. 1.

Secured to the rear of the frame 28 is a hitch 92. Due to the large pulling capacity of the pulling vehicle 12, the hitch 92 is preferably a large capacity hitch having a capacity of forty-five metric tons. As shown in FIGS. 2 and 4, the tool bar 14 is secured to the pulling vehicle by the hitch 92. Although the tool bar 14 may be of any type known in the art, in the preferred embodiment the tool bar 14 is a Nutri-Plac'r® 5300 pull-type applicator which is 16 meters wide. The tool bar 14 is provided with a hitch assembly 94 and a main frame 96 as shown in FIG. 4. Secured to the main frame 96 are two valves. The first valve is a one inch, electric on/off ball valve 98 such as the Raven on/off ball valve part number 063-0159-500 sold by Ag-Chem Equipment Co., Inc. of Minnetonka, Minn. The on/off ball valve 98 contains a ball (not shown) with a throughbore. The ball is coupled to a servo (not shown) which turns the ball ninety degrees to either allow the flow of material across the throughbore, or to halt the flow of material. Coupled in line with the ball valve 98 is a one inch electric control valve 99. The control valve 99 is substantially similar to the ball valve 98 except the control valve 99 is equipped with a variable servo (not shown) which can close the control valve 99 open the control valve 99 all the way or open the control valve 99 in substantially any increment therebetween. Both the ball valve 98 and control valve 99 are powered by the pulling vehicle 12.

As shown in FIG. 4, the main frame 96 comprises a front support bar 100 and a pair of lateral support bars 102 and a rear support bar 104. These support bars 100, 102, and 104 are connected to one another by a plurality of longitudinal supports 106. Secured to the tool bar 14 between the front support bar 100 and the rear support bar 104 are a pair of main wheels 108. With tires, the wheels 108 are about 1.5 meters in diameter and approximately 27 centimeters wide. Secured to the rear support bar 104 near the outer edges of the rear support bar 104 are a pair of outrigger wheels 110.

Figure 7:
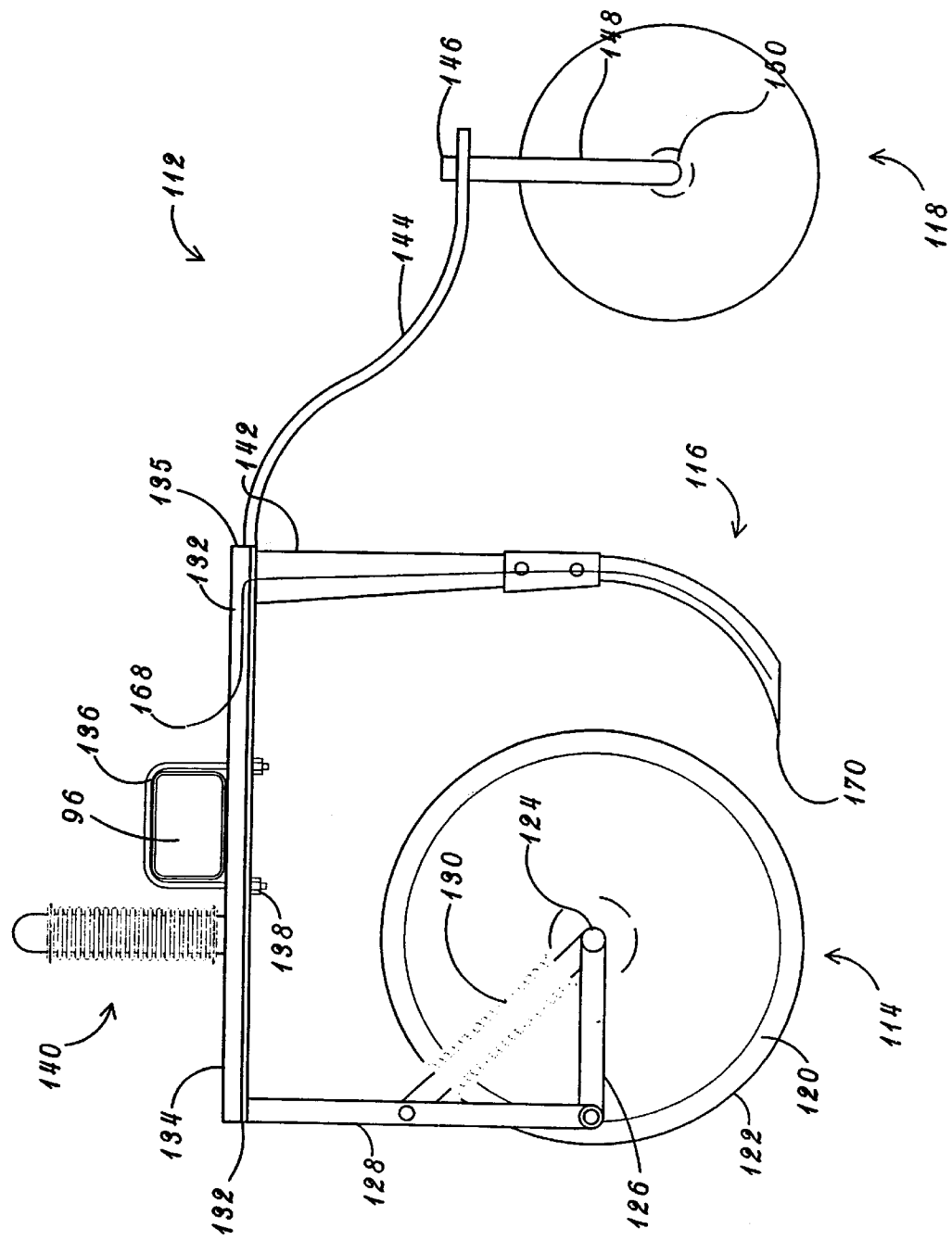
FIG. 7 is a side elevation of the injection assembly of the tool bar.

As shown in FIG. 4, the tool bar 14 is preferably provided with twenty-one injection assemblies 112 spaced slightly less than one meter apart. As shown in FIG. 7, each injection assembly 112 comprises an opener 114, a knife 116, and a pair of closers 118. The opener 114 comprises a metal disk 120 having a sharp beveled edge 122. An arbor 124 secures the disk 120 to a pivot arm 126. The pivot arm 126, in turn, is hingably coupled to a support arm 128.

Secured between the arbor 124 and the support arm 128 is a compression spring assembly 130. The compression spring assembly 130 allows the pivot arm 126 to pivot upward when the metal disk 120 encounters a rock or is otherwise placed under an extreme load. This pivoting action limits damage to the metal disk 120 and extends the life of the opener 114. The support arm 128 is secured to a mounting bracket 132. The mounting bracket 132 is coupled to a stationary plate 134 by a hinge 135. The stationary plate 134 is wider than the mounting bracket 132 to allow the stationary plate 134 to be secured to the main frame 96 by a pair of U-bolts 136 and nuts 138 which straddle the mounting bracket 132. The mounting bracket 132 is also secured to the stationary plate 134 by a compression spring assembly 140 which allows the mounting bracket 132 to pivot relative to the stationary plate 134 when the injection assembly 112 encounters a rock or is otherwise placed under an extreme load.

Depending from the mounting bracket 132, rearwardly from the opener 114, is a knife support bar 142. The knife 116 is secured to the knife support bar 142 by bolts or similar securement means known in the art. The knife 116 is preferably beveled to allow the knife 116 to pass easily through soil.

Extending from the mounting bracket 132, behind the knife 116, is a closer support bar 144. The closer support bar 144 is secured to a closer bracket 146. The closer support bar 144 extends laterally to either side of the closer bracket 146 to accommodate a pair of depending closer arms 148. The closer arms 148 are secured to the closers 118 by a pair of arbors 150. Each closer in each pair of closers 118 is preferably convex, relative to the closer 118 with which it is paired, to aid in pushing soil together after material has been injected into the soil at the knife 116.

Since the pump 80 is located below the tank 44, gravity draws anhydrous ammonia out of the tank 44 through the outlet 88 of the tank 44 (FIG. 1). The anhydrous ammonia moves through the excess flow valve 90 and into the inlet 80 of the pump 82. The pump 82, which is hydraulically driven by the engine 16 of the pulling vehicle 12, moves the anhydrous ammonia through the outlet 86 and through a hose 114 to the fluid meter 62 (FIGS. 1 and 3). Coupled to the fluid meter 62 is a pulse generator 154. As the anhydrous ammonia moves through the meter 62, the pulse generator 154 generates an electronic pulse. The pulse generator 154 is hardwired to a processing unit 156 located in a cab 160 of the pulling vehicle 12. While the processing unit 156 may be any type of personal computer known in the industry, in the preferred embodiment, the processing unit 156 is a Falcon processing unit, manufactured by Ag-Chem Equipment Co., Inc. of Minnetonka, Minn. The processing unit 156 translates pulses received from the pulse generator 154 into information regarding the flow of anhydrous ammonia and the processing unit 156 displays this information on a liquid crystal display 158 or a scale ticket printer 159 coupled to the processing unit 156.

From the fluid meter 62, the anhydrous ammonia moves through a hose 162 which is connected via a quick-disconnect type coupling 164 to a hose 166 provided on the tool bar 14 (FIGS. 3–4). The hose 166 is, in turn, connected to the ball valve 98 and control valve 99 provided on the tool bar 14 (FIG. 3). The control valve 99 is coupled to the injection assemblies 112 via a series of smaller hoses 168. As shown in FIG. 7, each of the smaller hoses 168 is secured to a knife 116 and terminates in an opening 170 at the tip of the knife 116.

In a similar fashion, a hose 172 is secured to the fluid outlet 60 of the liquid container 54 (FIG. 3). The hose 172 is connected to another hose 176 via a quick-disconnect type connector 174 (FIG. 4). As shown in FIG. 4, the hose 176 is connected to a pump and meter assembly 178 located on the tool bar 14. The pump and meter assembly may be of any type known in the art for pumping and metering liquid. Smaller hoses 180 are coupled between the pump and metering assembly 178 and the smaller hoses 168 which move the N-SERVE. Accordingly, material located within the liquid container 54 can be transferred from the liquid container 54, through the smaller hoses 168, to be distributed in confluence with the anhydrous ammonia through each opening 170 of the smaller hoses 168 at the tip of each knife 116 (FIGS. 3, 4 and 7).

To begin the application process, the anhydrous ammonia tank 44 is filled with anhydrous ammonia and the tool bar 14 is connected to the pulling vehicle 12 by the hitch assembly 92 (FIG. 1). The hoses 162 and 172 are connected via the quick-disconnect type couplers 164 and 174 to the hoses 166 and 176 of the tool bar 14 (FIG. 4). Additional electrical systems such as brake lights (not shown) provided on the tool bar may be coupled to the pulling vehicle via a quick-disconnect type electrical connector (not shown) so that all of the couplings to the tool bar 14 are of the quick-disconnect type. The quick-disconnect couplings prevent damage to the hoses 162, 166, 172 and 176, if the tool bar 14 were to become unintentionally disconnected from the pulling vehicle 12 (FIGS. 3–4). As shown in FIGS. 5 and 6, the tool bar 14 can be folded in on itself for transport or storage.

Once the tool bar 14 is coupled to the pulling vehicle 12, an operator (not shown), located within the cab 160 of the pulling vehicle 12, can actuate the pump 82 and pump and metering assembly 178 which are preferably wired to the processing unit 156 (FIGS. 1 and 4). The operator can monitor the amount of anhydrous ammonia or other material being applied via the monitor of the processing unit 156. As anhydrous ammonia is pumped from the tank 44 and into the soil through each knife 116, each metal disk 120 of each opener 114 cuts a shallow trench (not shown) into which anhydrous ammonia and any other desired material is deposited by each knife 116 (FIGS. 1 and 7). After the anhydrous ammonia and other material has been deposited, the closers 118 move the soil back over the trench created by the metal disk 120 of the opener 114.

The large surface area of the tires 36 and 38 of the pulling vehicle 12 prevent undesirable compaction of the soil, and since there is no tank or other heavy object being pulled behind the tool bar 14, there is no post-injection compaction of the soil. Once an operator has delivered a sufficient amount of anhydrous ammonia or other material, the operator shuts down the pumps 82 and 128 with the central processing unit 158 and stops the pulling vehicle 12 (FIGS. 1 and 4). Once application has stopped, the operator can print a ticket 204 in the cab 160 from the scale ticket printer 206 which shows the quantity of anhydrous ammonia delivered (FIG. 1).

If it is desired to refill the tank 44 with anhydrous ammonia, the anhydrous ammonia can be delivered directly into the tank 44 through an inlet 208 provided on the tank 44 (FIG. 1). If it is desired to use the pulling vehicle 12 for another use, the quick-disconnect type couplings 164 and 174 may be disconnected, along with any other electrical systems or other couplings, including the tool bar hitch 92 between the pulling vehicle 12 and tool bar 14 (FIGS. 1 and 4). The pulling vehicle 12 can then be pulled forward and all of the connections between the pulling vehicle 12 and the tank 44, such as the excess flow valve 90 to the pump 80 and the bolts 46, can be disconnected. To release the bolts 46, the nuts 50 of the bolts 46 are loosened and the bolts 46 are pivoted upward and out of the V-shaped retainers 54. A crane (not shown) or other device may then be used to lift the tank 44 from the pulling vehicle 12 so that the pulling vehicle 12 may be used for other purposes.

Figure 8:
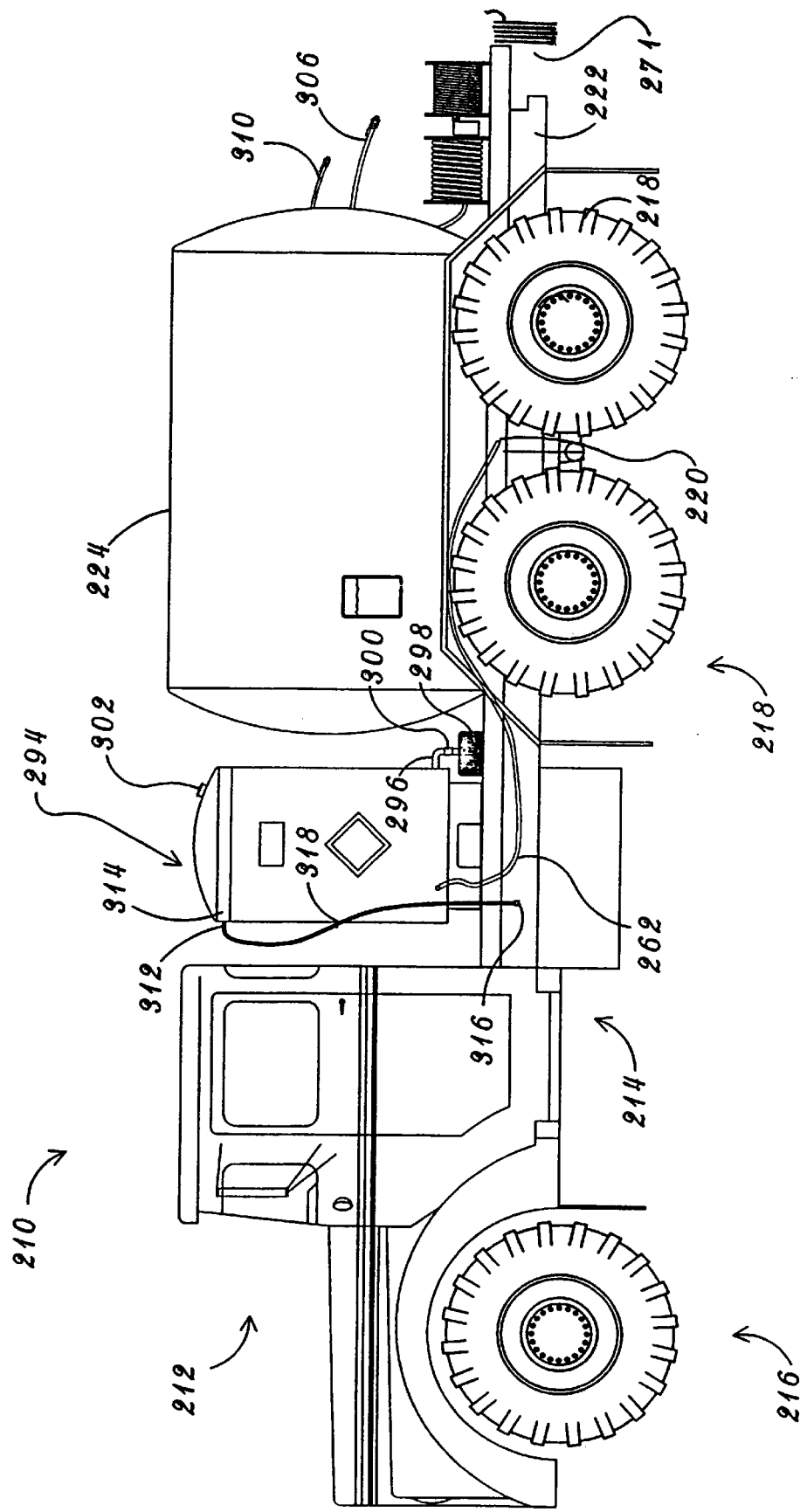
FIG. 8 is a side elevation of the nurse tank of the present invention.

To fill the tank 44 with anhydrous ammonia, a nurse truck 210 is provided as shown in FIG. 8. As shown in FIG. 8, the nurse truck 210 is provided with a cab 212 riding on a chassis 214. While the cab 212 and chassis 214 may be of any type known in the art, the cab 212 and chassis 214 are preferably a Freightliner FL80 having a payload capacity of about 7,700 kilograms. The chassis 214 is provided with a pair of front tires 216 and a pair of rear tires 218. The chassis 214 is provided with a frame 220 having side rails 222. Secured to the side rails 222 is a large pressure tank 224 constructed of steel and with a capacity of about nineteen thousand liters of anhydrous ammonia. Although the pressure tank 224 may be of any desired construction, the pressure tank 224 is preferably provided with a capacity ranging from about seven thousand five hundred liters to forty thousand liters of anhydrous ammonia. While in the preferred embodiment of the present invention the pressure tank 224 is welded to the side rails 222 of the frame 220, the pressure tank 224 may instead be bolted to the side rails 222 so that the pressure tank 224 may be disconnected from the side rails 222.

Figure 9:
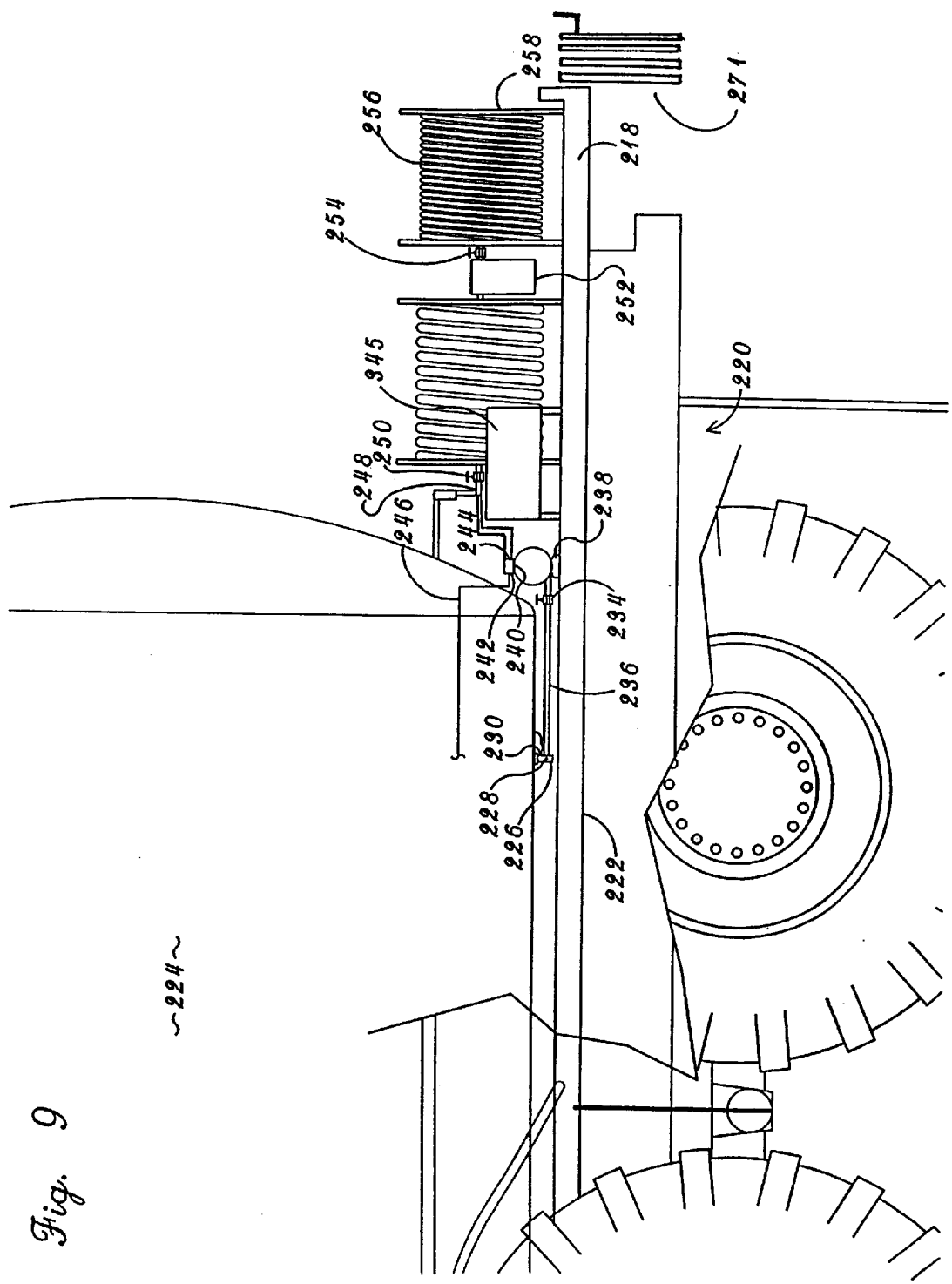
FIG. 9 is a side elevation of the rear of the nurse tank of FIG. 8.

Preferably, all of the plumbing on the nurse tank is Schedule 80 seamless steel plumbing. Secured to the bottom of the tank 224 is a belly valve 226 having a valve 228 (FIGS. 8 and 9). The valve 228 is coupled via a wire 230 to the cab 212. The belly valve 226 is coupled to a four inch intake pipe 236 connected to a ball valve 234 which controls the flow of ammonia into an inlet of a pump 238 which, in the preferred embodiment, is a Corken Z4200 (FIG. 9). The pump 238 is provided with an outlet 240 to which is secured a dual discharge 242.

One outlet of the dual discharge 242 is coupled to a T-fitting 244. One outlet of the T-fitting 244 is coupled to a two inch bypass 246. The other outlet of the T-fitting 244 is coupled to another T-fitting 248. The T-fitting 248 is coupled to a ball valve 250 which, is coupled to a vapor eliminator 251 such as those well known in the art. The vapor eliminator 251 is coupled to a fluid meter 252 which, in the preferred embodiment, is a Micromotion Model D Mass Sensor. The fluid meter 252 is coupled to a ball valve 254 which, in turn, is coupled to a differential valve 255 such as those well known in the art. The differential valve 255 is coupled to a one inch liquid hose 256 wound around a reel 258.

Figure 10:
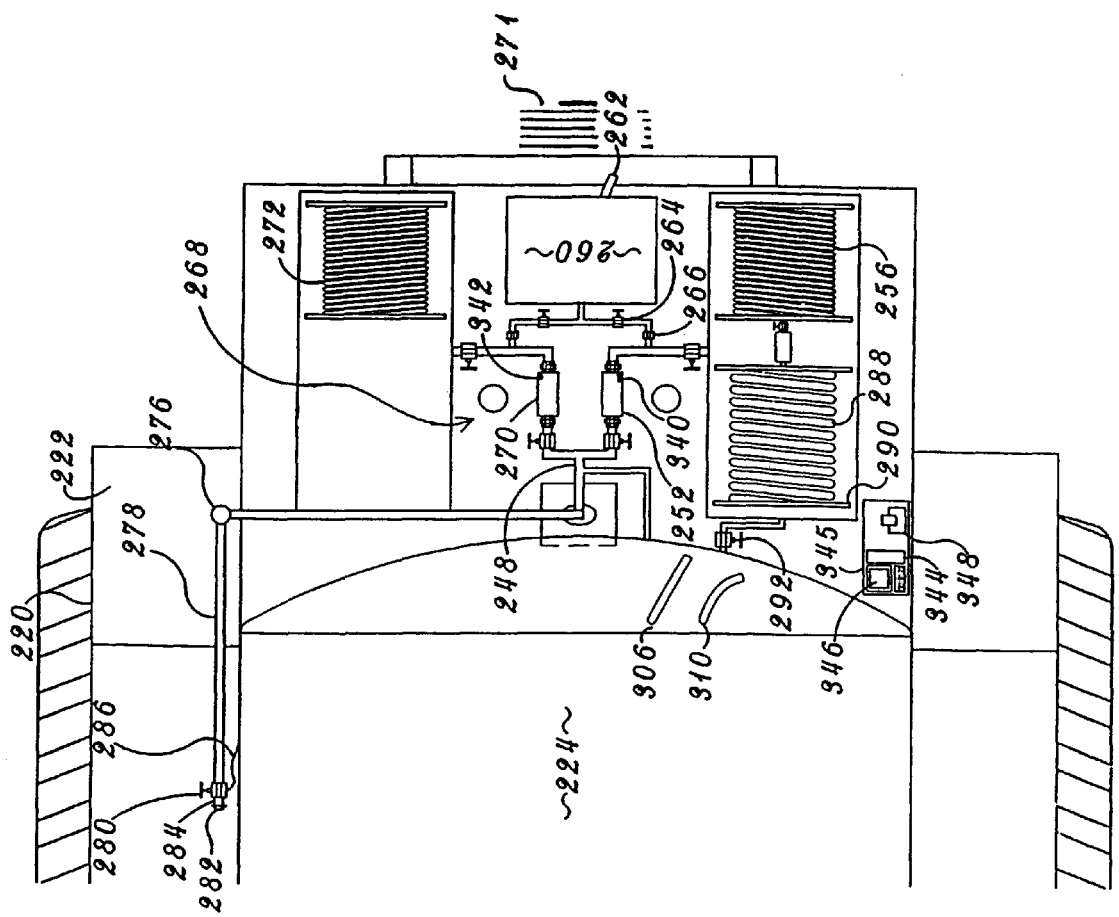
FIG. 10 is a top elevation of the rear of the nurse tank of FIG. 8.

Secured to the truck frame 220 is an N-serve injector 260 which, in the preferred embodiment, is a Model 3005 Injector manufactured by Economy Controls Corporation of St. Louis, Mo., but may, of course, be any suitable injector (FIG. 10). The injector 260 is coupled by a transfer hose 262 to an N-serve supply which is described more fully below.

The N-serve injector 260 is coupled to a ball valve 264 and a check valve 266 before being coupled to the one inch liquid hose 256. As shown in FIG. 10, a sister delivery system 268 is coupled to the other side of the T-fitting 248. The sister delivery system 268 is provided with a second fluid meter 270 and a hose 272. The hose 272 is one inch in diameter.

Also as shown in FIG. 10, the dual discharge is coupled to a two inch swivel 276. The two inch swivel 276 is connected to a two inch hose 278 and a ball valve 280. Provided on the end of the two inch hose 278 is a two inch ball valve 280 and a standard ACME fitting 282. Preferably provided in securement with the ACME fitting 282 is a bleeder valve 284 coupled to a fifty gallon water tank (not shown) by a bleeder hose 286. Preferably provided between each set of ball valves, are hydrostatic valves (not shown) which prevent pressure from building up within the plumbing and which release pressure before the plumbing bursts. Secured to the truck frame 220 is a reel 290 for storage of a 1.25 inch vapor hose 288. The vapor hose 288 is secured to a ball valve 292 before entering the tank 224.

Secured to the frame 220 between the cab 212 and the pressure tank 224 is a nitrogen stabilizer tank 294 (FIG. 8). The nitrogen stabilizer tank 294 is secured to the frame 220 by weldments or similar securement means. If it is desired to have the nitrogen stabilizer tank 294 be removable from the frame 220, the nitrogen stabilizer tank 294 may be releasably secured to the frame 220 with bolts or similar releasable securement means (not shown).

As shown in FIG. 8, the nurse truck 210 is used to generate compressed air, by means known in the art, which is provided to the nitrogen stabilizer tank 294 by a pressure hose 296. Preferably some of the air pressure generated to operate the air brakes (not shown) of the nurse truck 210 is passed through a regulator 298 to reduce the pressure to approximately fourteen pounds per square inch. Also provided on the pressure hose 296 is a check valve 300 to prevent nitrogen stabilizer from back-flowing through the pressure hose 296 and into the air brakes of the nurse truck 210. Provided on the nitrogen stabilizer tank 294 is a pop-off valve 302 which is set to release pressure within the stabilizer tank 294 if pressure builds to a dangerous level. Coupled into fluid communication with the nitrogen stabilizer tank 294 is the transfer hose 262. Due to the corrosive nature of nitrogen stabilizer, the transfer hose 262, the pressure hose 296 and all other components coming into contact with nitrogen stabilizer are preferably constructed of nylon or any material which is not easily rusted or pitted by nitrogen stabilizer. Polyvinyl chloride and other materials are also well known in the art to resist corrosion by nitrogen stabilizer and may be used to construct aspects of the nurse truck 210 coming into contact with nitrogen stabilizer.

Figure 11:
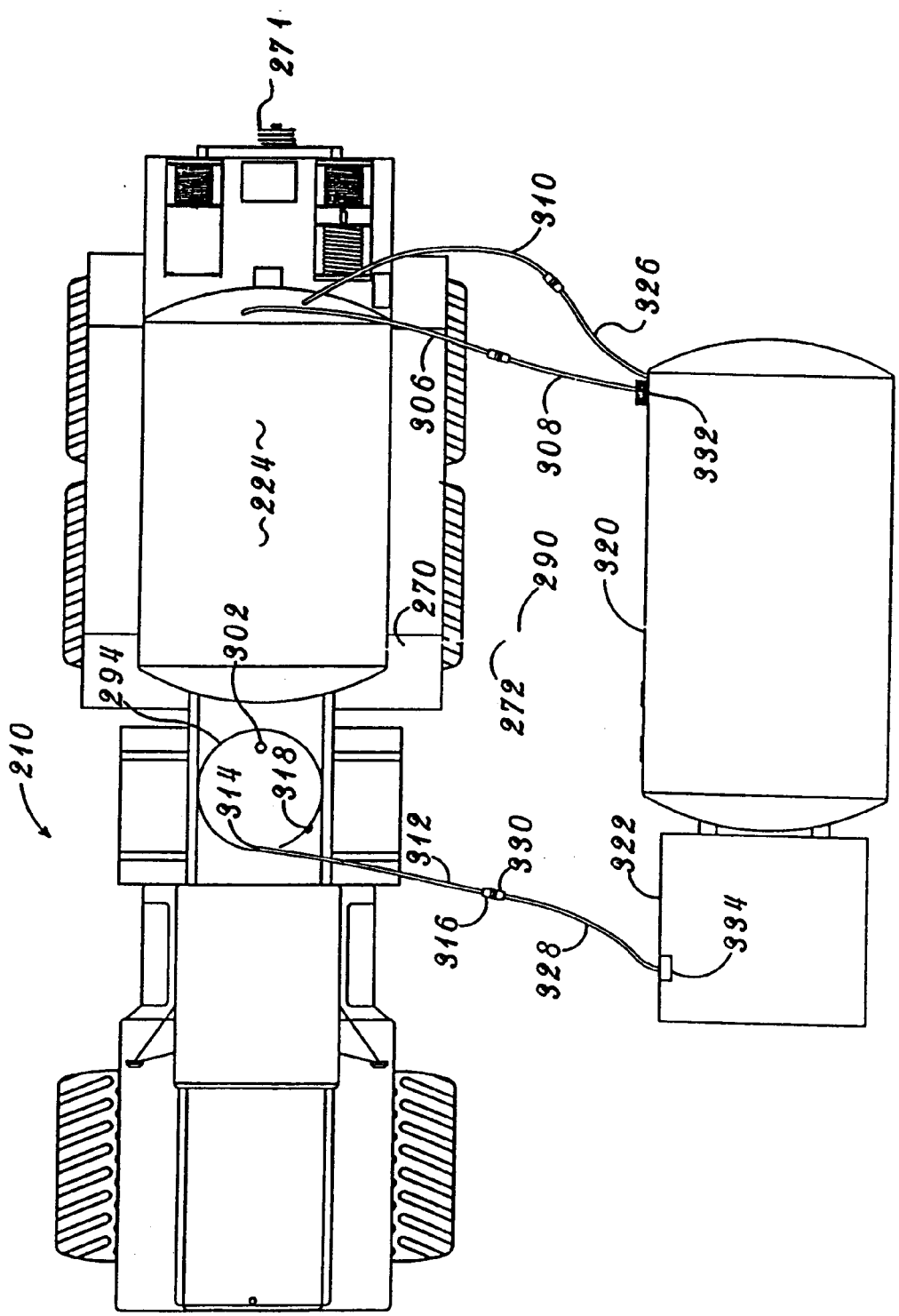
FIG. 11 is a top elevation of the nurse tank of FIG. 8 being supplied with anhydrous ammonia from a reservoir tank.

As shown in FIG. 8, the pressure tank 224 is provided with an inlet hose 306. When it is desired to fill the pressure tank 224, a transfer hose 308 is secured to the inlet hose 306 and material is pumped through the inlet hose 306 until the pressure tank 224 is filled. (FIGS. 8 and 11). The pressure tank 224 is also provided with a vapor recovery hose 310 to return vapor during the filling process.

The nitrogen stabilizer tank 294 is provided with a fill hose 312 in fluid communication with an inlet 314 provided in the nitrogen stabilizer tank 294. The fill hose 312 for the nitrogen stabilizer tank 294 is provided with a quick disconnect coupling 316 and is releasably secured to the nitrogen stabilizer tank 294 by a plurality of clamps 318 secured to the nitrogen stabilizer tank 294.

When it is desired to transport anhydrous ammonia and nitrogen stabilizer using the nurse truck 210, the nurse truck 210 is pulled alongside a reservoir tank 320 (FIG. 11). The reservoir tank 320 may either be a stationary tank secured to the ground or the reservoir tank 320 may be a railroad tank car. The reservoir tank 320 may, of course, be any suitable tank for holding anhydrous ammonia. Preferably, if the reservoir tank 320 is stationary, a nitrogen stabilizer storage tank 322 is provided nearby. The nitrogen stabilizer storage tank 322 is preferably constructed of polyvinyl chloride or similar material which is not subject to rusting or pitting by material contained therein.

As shown in FIG. 11, the anhydrous ammonia reservoir tank 320 is provided with the transfer hose 308 and a vapor hose 326. The nitrogen stabilizer storage tank 322 is provided with a transfer hose 328 and a quick disconnect coupler 330. When it is desired to fill the nurse truck 210, the nurse truck 210 is pulled alongside the anhydrous ammonia reservoir tank 320, and the nitrogen stabilizer storage tank 322. The transfer hose 308 of the reservoir tank 320 is releasably secured to the inlet hose 306 of the pressure tank 224 and the vapor return hose 326 is releasably secured to the vapor recovery hose 310 (FIGS. 8 and 11). Thereafter, a pump 332 secured to the reservoir tank 320 is actuated to move anhydrous ammonia from the reservoir tank 320 through the transfer hose 308 into the pressure tank 224 through the inlet hose 306. Excess vapor is returned to the reservoir tank 320 through the vapor return hose 326. Once filling is complete, the pump 332 is shut off and the hoses 306, 308, 310 and 326 are disconnected.

When it is desired to fill the nitrogen stabilizer tank 294, the fill hose 312 is released from the clamps 318 of the nitrogen stabilizer tank 294. The quick disconnect coupling 316 of the fill hose 312 is then releasably connected to the quick disconnect coupling 330 of the transfer hose 328 and a pump 334 secured to the nitrogen stabilizer storage tank 322 is actuated to begin moving nitrogen stabilizer from the nitrogen stabilizer storage tank 322 through the transfer hose 328, through the fill hose 312 and into the nitrogen stabilizer tank 294 through the inlet 314. Once the nitrogen stabilizer tank 294 has been filled, the pump 334 is shut off and the quick disconnect coupling 330 of the transfer hose 328 is disconnected from the quick disconnect coupling 316 of the fill hose 312. The fill hose 312 is then resecured to the clamps 318 of the nitrogen stabilizer tank 294.

Figure 12:
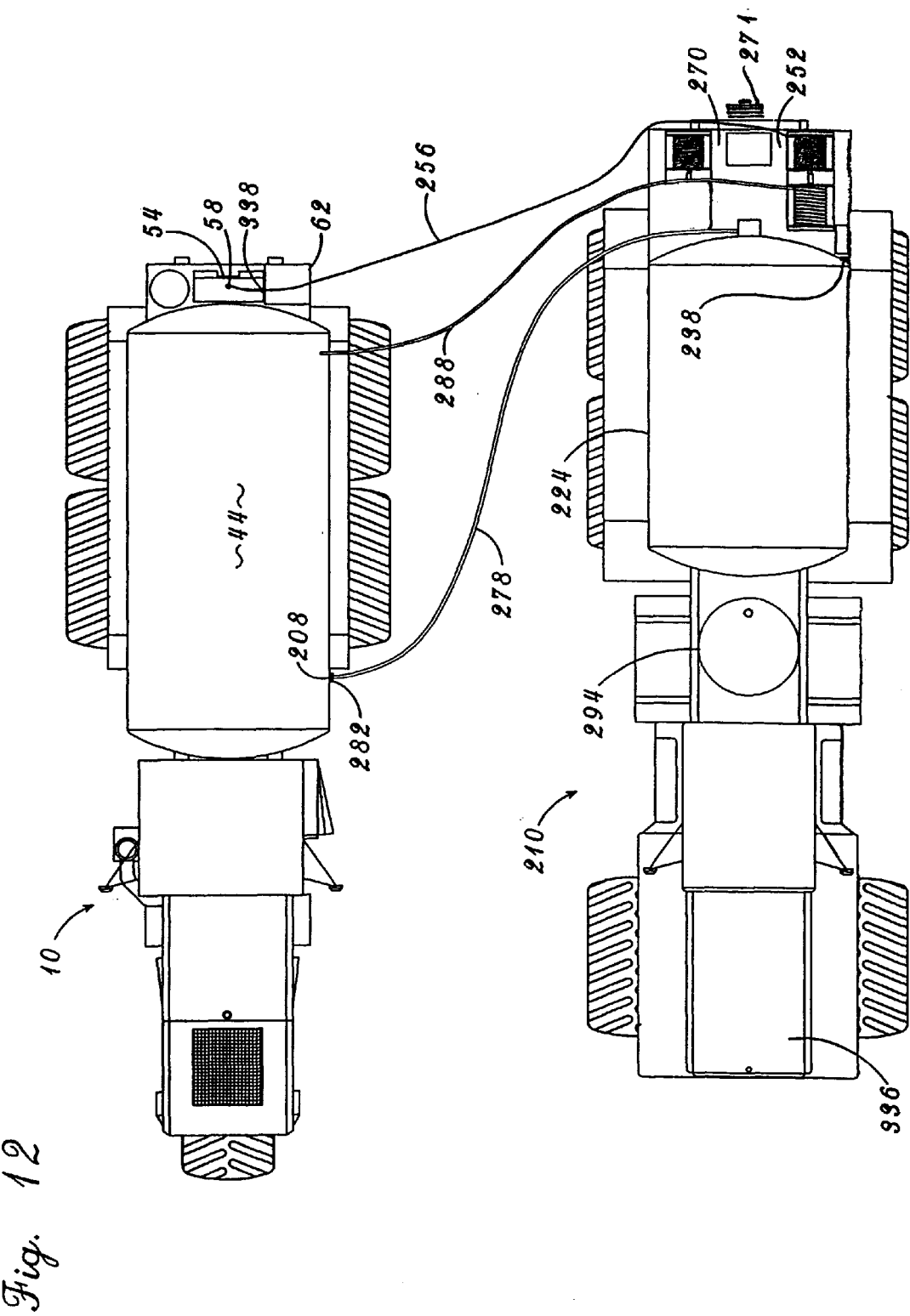
FIG. 12 is a top elevation of the nurse tank of FIG. 8 supplying the pulling vehicle of FIG. 1 with anhydrous ammonia.

Once the nurse truck 210 has been filled, the nurse truck 210 may be driven from the reservoir tank 320 and nitrogen stabilizer storage tank 322 to the anhydrous ammonia applicator 10 (FIGS. 11–12). As shown in FIG. 12, when it is desired to fill the anhydrous ammonia applicator 10 the nurse truck 210 is pulled alongside the anhydrous ammonia applicator 10. The two-inch ACME fitting 282 of the nurse truck 210 is releasably secured to the inlet 208 of the anhydrous ammonia applicator 10. Alternatively, the anhydrous ammonia applicator 10 may be provided with a fill hose (not shown) having a quick disconnect coupler which may be secured to the two-inch ACME fitting 282.

Once the two-inch ACME fitting 282 has been secured to the inlet 208 of the anhydrous ammonia applicator 10, the vapor hose 288 is releasably secured to the anhydrous ammonia tank 44. The pump 238 of the nurse truck 210 is then actuated to begin transferring anhydrous ammonia from the pressure tank 224 to the anhydrous ammonia tank 44. Preferably the pump 238 is hydraulically driven using energy supplied by the engine 336 of the nurse truck 210. As the anhydrous ammonia tank 44 is filled, vapor returns to the pressure tank 224 to allow faster filling of the anhydrous ammonia tank 44.

Since the anhydrous ammonia applicator 10 is fitted with its own mass flow meter 62 the two-inch hose 278 bypasses the mass flow meters 252 and 270 of the nurse truck 210 (FIGS. 10 and 12). The anhydrous ammonia will be measured by the mass flow meter 62 of the anhydrous ammonia applicator 10 as it is delivered to the field. Once the anhydrous ammonia tank 44 has been filled or the pressure tank 224 has been emptied, the pump 238 is shut off and the ACME fitting 282 is disconnected from the inlet 208 of the anhydrous ammonia tank 44. When it is desired to fill the nitrogen stabilizer container 54, an auxiliary hose 271 is secured to the inlet 58 for the nitrogen stabilizer container 54. (FIGS. 10 and 12). The flow of nitrogen stabilizer is from the nitrogen stabilizer tank 294, through a liquid hose 255 and into the nitrogen stabilizer container 54.

Once the anhydrous ammonia applicator 10 has been filled, the nurse truck 210 returns to the reservoir tank 320 and nitrogen stabilizer storage tank 322 to be filled with anhydrous ammonia and nitrogen stabilizer (FIGS. 11–12).

The nurse truck 210 may also be used to measure material as it is being dispensed. Coupled to the flow meters 252 and 270 are pulse generators 340 and 342 (FIGS. 8 and 10). As the anhydrous ammonia moves through the flow meters 252 and 270, the pulse generators 340 and 342 generate electronic pulses. The pulse generators 340 and 342 are hard-wired to a processing unit 344 located in a water-tight box 345 secured to the truck frame 220. The box 345 is preferably constructed of polyethylene with a clear acrylic cover, but any suitable material may be used. Alternatively, the central processing unit 344 may be located in the cab 212 of the nurse truck 210. While the processing unit 344 may be any type of personal computer known in the industry, in the preferred embodiment, the processing unit 344 is a Contrec Model 405 Flow Computer. The processing unit 344 translates pulses received from the pulse generators 340 and 342 into information regarding the flow of anhydrous ammonia. The processing unit 344 displays this information on a liquid crystal display 346 or a slip printer 348 coupled to the processing unit 344.

The nurse truck 210 may be used to fill a smaller tank assembly 350 in the field. As shown in FIG. 13, the smaller tank assembly 350 includes a frame 352, a hitch 354, a tank 356 having an opening 358, and four wheels 360. The smaller tank assembly 350 is designed to be pulled behind a standard tool bar (not shown). To fill the smaller tank assembly 350, the nurse truck 210 is pulled alongside the tank 350 and the liquid hose 256 is unwound from the reel 258. The ball valve 338 secured to the liquid hose 256 is coupled to the opening 358 of the tank 350 and the ball valve 338 is opened to fill the tank 350. When the tank 350 is filled, the ball valve 338 is closed and removed.

When the smaller tank assembly 350 has been filled, the liquid hose 256 is wound back onto the reel 258. Since anhydrous ammonia passing through the liquid hose 256 also passes through the flow meter 252, the exact amount of material delivered to the smaller tank assembly 350 may be measured and recorded. As the anhydrous ammonia passes through the flow meter 252, the pulse generator 340 sends pulses to the processing unit 344 (FIGS. 10 and 13). The processing unit 344 converts these pulses into measurement information regarding the anhydrous ammonia being delivered.

This measurement information may either be displayed on the liquid crystal display 346 and/or used to print a ticket on the slip ticket printer 348. In this way, the exact amount of anhydrous ammonia being delivered may be accurately measured for billing to a particular client. If it desired to fill numerous tank assemblies for a single customer, both liquid hoses 256 and 272 can be used to fill two separate tank assemblies 350 and 366 at once. As the two tank assemblies are being filled, the flow meters 252 and 270 record the amount of product being delivered and send this information to the processing unit 344 via the pulse generators 340 and 342.

If desired, nitrogen stabilizer may be added to the tank 350 in confluence with the ammonia (FIGS. 10 and 13). To add nitrogen stabilizer to the tank 350, the ball valve 264 is opened and the N-serve injector 260 is programmed to deliver a predetermined amount of N-serve. The N-serve injector 260 is then actuated to deliver N-serve through the ball valve 264 and hose 256 into the tank 350. Once the appropriate amount of nitrogen stabilizer has been delivered, the ball valve 264 is closed and the appropriate amount of ammonia is delivered to the tank 350 through the hose 256. By delivering the ammonia after the nitrogen stabilizer, the corrosive nitrogen stabilizer is flushed out of the hose 256.

As noted above, the nitrogen stabilizer tank 294 and pressure tank 224 may be secured to the frame 220 of the nurse truck 210 by bolts or similar releasable securement means (FIG. 8). Accordingly, if it is desired to use the nurse truck 210 to deliver anhydrous ammonia and it is not desired to deliver nitrogen stabilizer, the nitrogen stabilizer tank 294 may be removed. The pressure tank 224 may then be released and moved toward the cab 212 of the nurse truck 210 before being resecured to the frame 220. Accordingly, the pressure tank 224 may be centered over the tires 216 and 218 and, if desired, a larger pressure tank (not shown) may be secured to the frame 220 in the spaces formerly occupied by the nitrogen stabilizer tank 294 and pressure tank 224 if it is desired to transport a larger amount of anhydrous ammonia.

Although the invention has been described with respect to a preferred embodiment thereof, it is to be understood that it is not to be so limited, since changes and modifications can be made therein which are within the full intended scope of this invention as defined by the appended claims. For example, it is anticipated that a plurality of tanks may be secured to the nurse truck 210 to supply the anhydrous ammonia applicator 10 with a plurality of materials. It is additionally anticipated that both the nitrogen stabilizer tank 294 and pressure tank 224 may be of various dimensions to accommodate varying transportation requirements.

What is claimed is:

1. A nurse truck for transporting and delivering anhydrous ammonia to various types of vehicles comprising:
   (a) a chassis comprising:
      (i) a frame;
      (ii) a pair of front wheels supporting the front portion of said chassis;
      (iii) at least four rear wheels for supporting the rear portion of said chassis;
      (iv) means for driving a wheel selected from the group consisting of said front wheels and said rear wheels;
   (b) a gas-tight anhydrous ammonia tank having a capacity of at least five thousand liters of fluid anhydrous ammonia; and
   (c) distribution means in fluid communication with said ammonia tank and having fluid pump means for pumping ammonia from said tank, said distribution means also having:
      (1) an unmetered first branch for supplying ammonia from said pumping means to a first vehicle that has a fluid flow metering means for determining the amount of ammonia received from the nurse truck;
      (2) a second branch for supplying ammonia from said pumping means to a second vehicle that has no fluid flow metering means; and
      (3) said second branch including a fluid flow metering means comprised of a fluid flow meter for determining the amount of ammonia flowing through said branch to said second vehicle.

2. The nurse truck of claim 1 wherein said metering means of said second branch further includes a display means associated with said fluid flow meter to provide a visual display of the amount of ammonia passing to said second vehicle.

3. The nurse truck of claim 2 wherein said display means comprises a pulse generator that generates electronic pulses representative of the amount of ammonia flowing through said second branch and a processing unit that translates said pulses into a visual display of said amount of ammonia.

4. The nurse truck of claim 1 wherein said ammonia tank is located over the rear wheels of said chassis, substantially in vertical alignment therewith.

5. The nurse truck of claim 4 further comprising a nitrogen stabilizer tank secured to said frame of said chassis in a position intermediate the front and rear wheels of said chassis.

6. The nurse truck of claim 5 further comprising means in a fluid communication with said nitrogen stabilizer tank for pumping nitrogen stabilizer from said nitrogen stabilizer tank to said vehicles and a stabilizer injector for supplying said stabilizer to said second branch.

7. The nurse truck of claim 5, wherein said nitrogen stabilizer tank has a capacity of at least five hundred liters.

8. The nurse truck of claim 5, wherein said nitrogen stabilizer tank is constructed of a non-corrosive material.

9. The nurse truck of claim 1, wherein said frame has a payload capacity of at least five thousand kilograms.

10. The nurse truck of claim 1, wherein said frame has a payload capacity of at least ten thousand kilograms.

11. The nurse truck of claim 1, wherein said driving means is means for driving said chassis at a speed of at least sixty kilometers per hour.

12. The nurse truck of claim 1, wherein said driving means is means for driving said chassis at a speed of at least one hundred kilometers per hour.

13. The nurse truck of claim 1, wherein said pumping means is means for pumping anhydrous ammonia at a rate of at least five hundred liters per minute.

14. The nurse truck of claim 1, further comprising a quick disconnect fitting coupled to a hose coupled to said pumping means.

* * * * *